(12) United States Patent
Snyder

(10) Patent No.: US 6,698,180 B2
(45) Date of Patent: Mar. 2, 2004

(54) PARTICLE SEPARATOR FOR A TURBINE ENGINE

(75) Inventor: Philip H. Snyder, Avon, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 33 days.

(21) Appl. No.: 10/216,978

(22) Filed: Aug. 12, 2002

(65) Prior Publication Data

US 2003/0024233 A1 Feb. 6, 2003

Related U.S. Application Data

(63) Continuation-in-part of application No. 09/920,566, filed on Aug. 1, 2001, now Pat. No. 6,508,052.

(51) Int. Cl.[7] .............................................. B01D 45/16
(52) U.S. Cl. ................... 60/39.092; 55/306; 55/385.1; 55/385.3; 55/396; 244/53 B; 137/15.1
(58) Field of Search ................... 60/39.092; 55/306, 55/385.1, 385.3, 396, 398; 244/53 B; 137/15.1

(56) References Cited

U.S. PATENT DOCUMENTS

| 3,444,672 A | | 5/1969 | Alsobrooks | |
|---|---|---|---|---|
| 3,465,950 A | | 9/1969 | Freid | |
| 3,521,431 A | * | 7/1970 | Connors et al. | 55/306 |
| 3,534,548 A | * | 10/1970 | Connors | 60/39.092 |
| 3,616,616 A | * | 11/1971 | Flatt | 55/306 |
| 3,673,771 A | * | 7/1972 | Dickey | 55/306 |
| 3,778,983 A | * | 12/1973 | Rygg | 55/306 |
| 3,832,086 A | * | 8/1974 | Hull et al. | 415/121.2 |
| 3,970,439 A | * | 7/1976 | Murphy | 55/306 |
| 3,979,903 A | | 9/1976 | Hull, Jr. et al. | |
| 3,998,048 A | * | 12/1976 | Derue | 60/39.092 |
| 4,509,962 A | * | 4/1985 | Breitman et al. | 55/306 |
| 4,527,387 A | * | 7/1985 | Lastrina et al. | 60/39.092 |
| 4,592,765 A | * | 6/1986 | Breitman et al. | 55/306 |
| 4,617,028 A | * | 10/1986 | Ray et al. | 95/267 |
| 4,685,942 A | * | 8/1987 | Klassen et al. | 55/306 |
| 4,702,071 A | * | 10/1987 | Jenkins et al. | 60/39.092 |
| 4,704,145 A | * | 11/1987 | Norris et al. | 55/306 |
| 4,860,534 A | * | 8/1989 | Easley et al. | 60/39.092 |
| 4,881,367 A | * | 11/1989 | Flatman | 60/785 |
| 4,928,480 A | | 5/1990 | Oliver et al. | |
| 5,039,317 A | * | 8/1991 | Thompson et al. | 95/272 |
| 5,139,545 A | * | 8/1992 | Mann | 55/306 |
| 5,279,109 A | | 1/1994 | Liu et al. | |
| 5,433,070 A | * | 7/1995 | Amelio | 60/796 |
| 6,134,874 A | * | 10/2000 | Stoten | 60/39.092 |
| 6,499,285 B1 | * | 12/2002 | Snyder | 60/39.092 |

FOREIGN PATENT DOCUMENTS

DE    2 039 999 A    12/1979

\* cited by examiner

*Primary Examiner*—Charles G. Freay
(74) *Attorney, Agent, or Firm*—Barnes & Thornburg

(57) ABSTRACT

A particle separator for use with a turbine engine is arranged to divide a flow of air into a radially inner air flow and a radially outer air flow. The particle separator is further arranged to separate inner particles from the inner air flow to allow air from the inner air flow to enter the turbine engine without the inner particles and arranged to separate outer particles from the outer air flow to allow air from the outer air flow to enter the turbine engine without the outer particles.

27 Claims, 10 Drawing Sheets

PARTICLE SEPARATOR FOR A TURBINE ENGINE

This disclosure is a continuation-in-part of U.S. application Ser. No. 09/920,566, now U.S. Pat. No. 6,508,052 which was filed Aug. 1, 2001 and which is hereby incorporated by reference herein.

BACKGROUND

The present disclosure relates to a particle separator for use with a turbine engine. The particle separator separates particles from air entering the turbine engine.

Particle separators are provided to separate undesirable particles from a flow of air entering a turbine engine. Such undesirable particles could adversely affect the internal working components of the engine if they were allowed to enter the engine.

SUMMARY

According to the present disclosure, a particle separator for use with a turbine engine is arranged to divide a flow of air into a radially inner air flow and a radially outer air flow. The particle separator is further arranged to separate inner particles from the inner air flow to allow air from the inner air flow to enter the turbine engine without the inner particles and arranged to separate outer particles from the outer air flow to allow air from the outer air flow to enter the turbine engine without the outer particles.

Additional features and advantages of the apparatus will become apparent to those skilled in the art upon consideration of the following detailed descriptions exemplifying the best mode of carrying out the apparatus as presently perceived.

BRIEF DESCRIPTION OF THE DRAWINGS

The detailed description particularly refers to the accompanying figures in which.

DETAILED DESCRIPTION OF DRAWINGS

Figure 1:
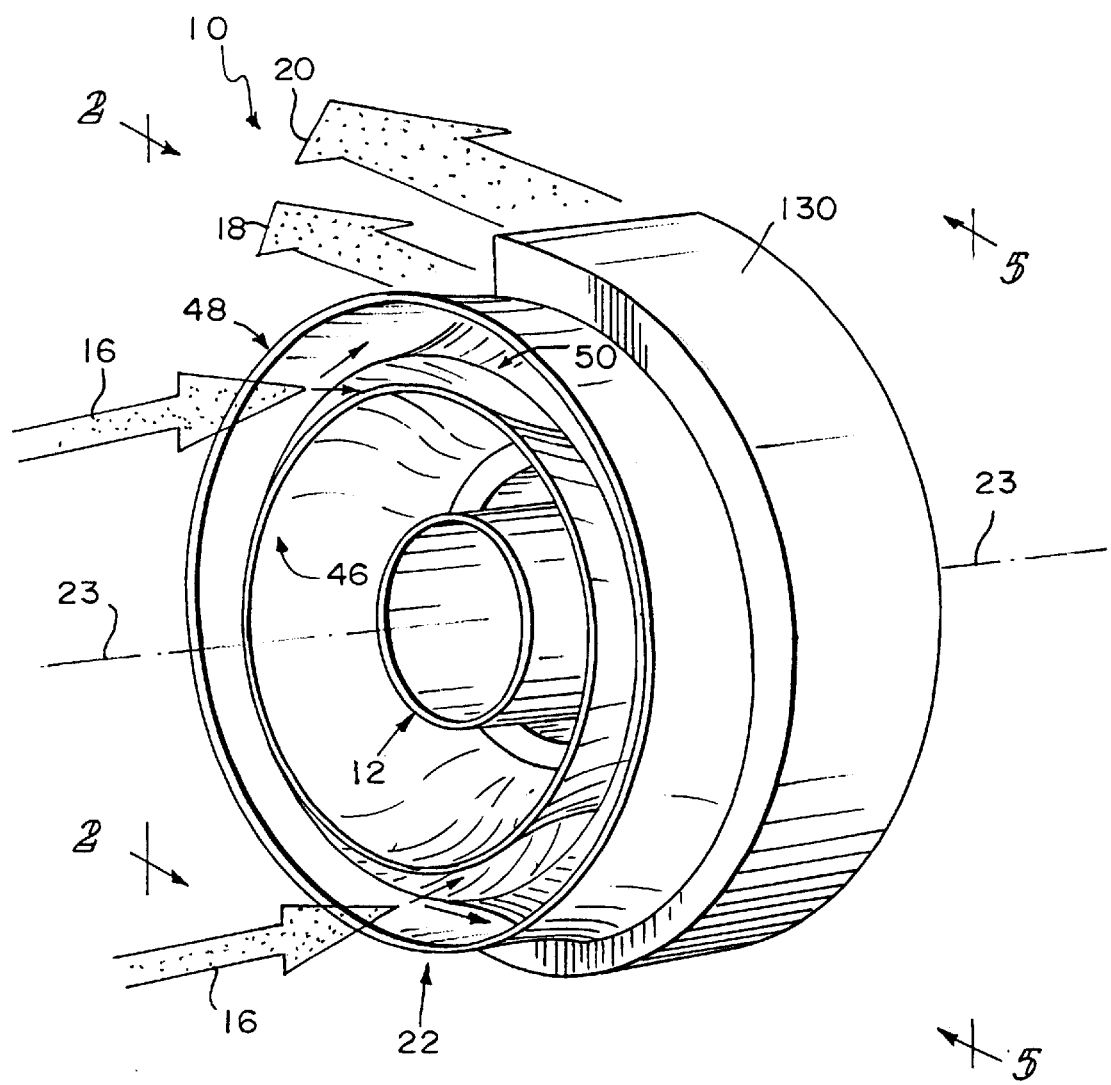
FIG. 1 is a perspective view of a particle separator for separating particles from air entering a turbine engine.
Figure 2:
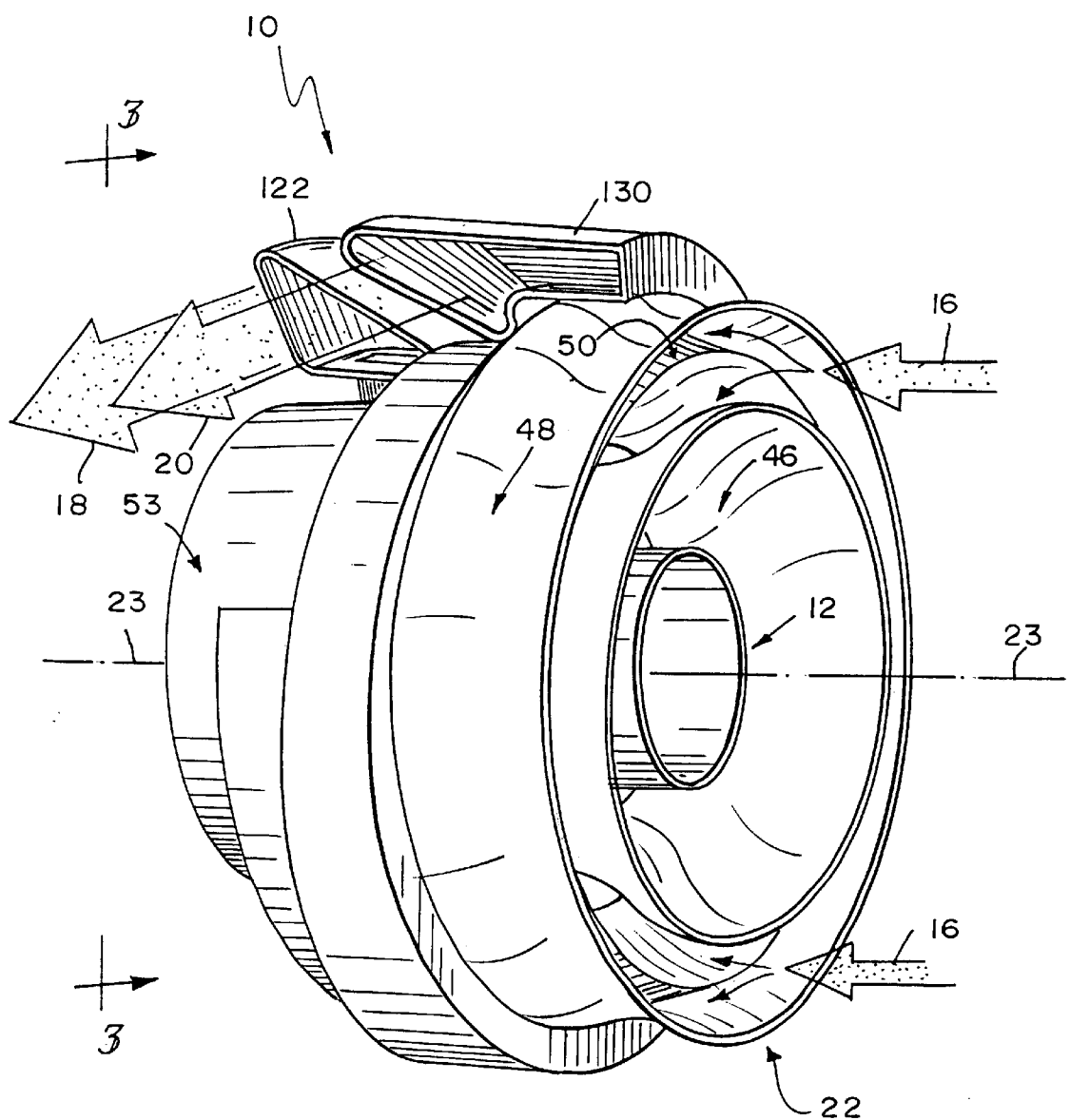
FIG. 2 is a perspective view of the particle separator as viewed in a direction suggested by line 2—2 of FIG. 1.
Figure 3:
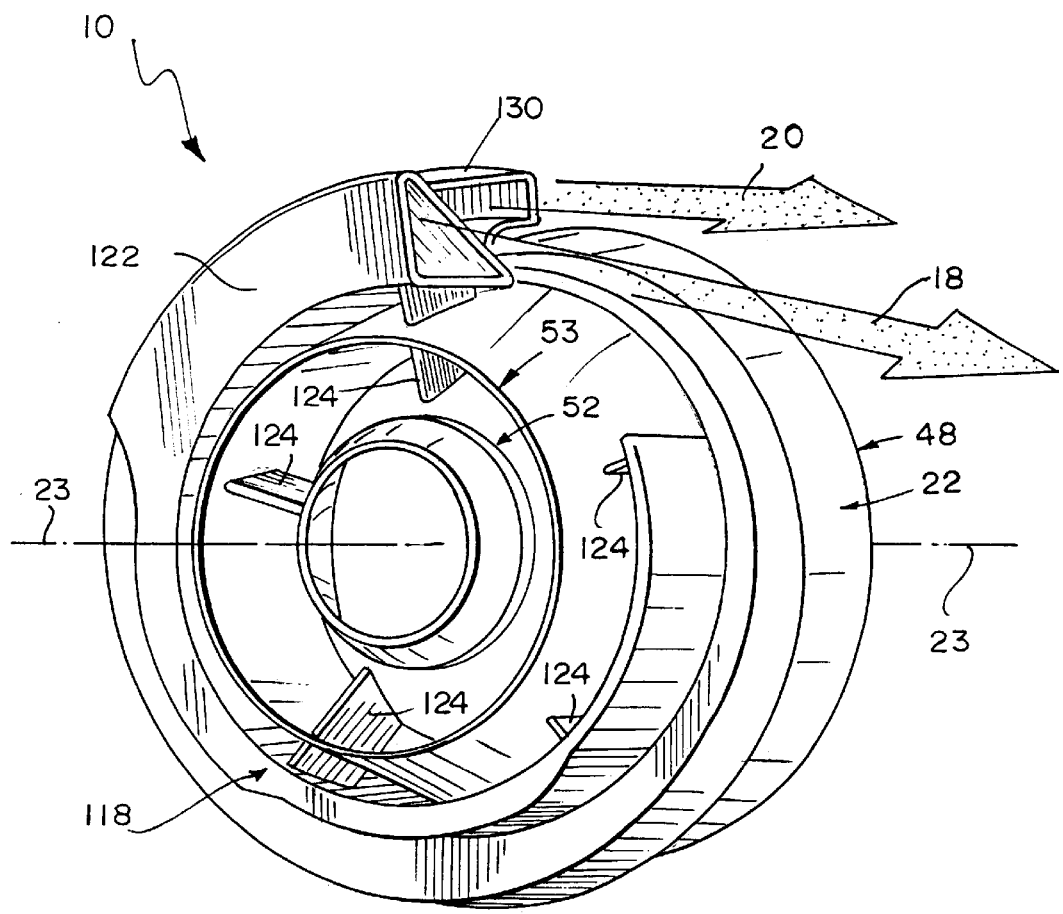
FIG. 3 is a perspective view of the particle separator as viewed in a direction suggested by line 3—3 of FIG. 2.

A particle separator 10 for use with a gas turbine engine 12 is shown, for example, in FIGS. 1–6. Separator 10 is arranged to separate particles, such as sand and dust, from air before the air enters an air inlet 14 (see FIG. 5) of engine 12. In general, separator 10 first divides a flow 16 of air having particles entrained therein into a radially inner air flow and a radially outer air flow. Separator 10 then divides each of the inner and outer air flows to separate the particles entrained therein from air that enters inlet 14. The separated particles are then discharged away from engine 12, as indicated by arrows 18, 20.

Separator 10 comprises an air intake 22, as shown in FIGS. 1–6. Intake 22 has a central axis 23 which coincides, for example, with a central axis of engine 12. Radial relationships disclosed herein are relative to axis 23.

Figure 4:
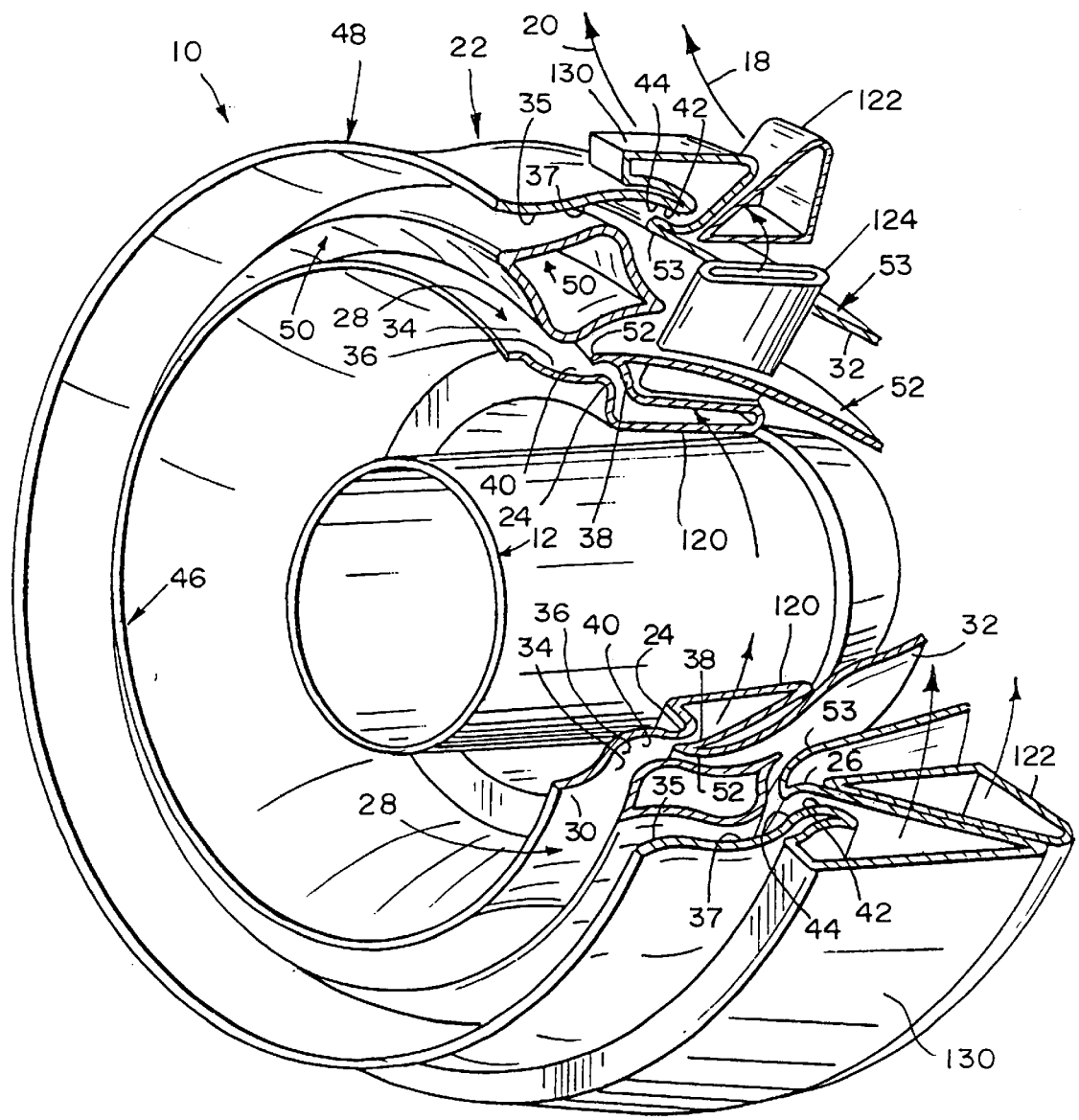
FIG. 4 is a perspective view similar to FIG. 1 with portions broken away to show the interior of the particle separator.
Figure 5:
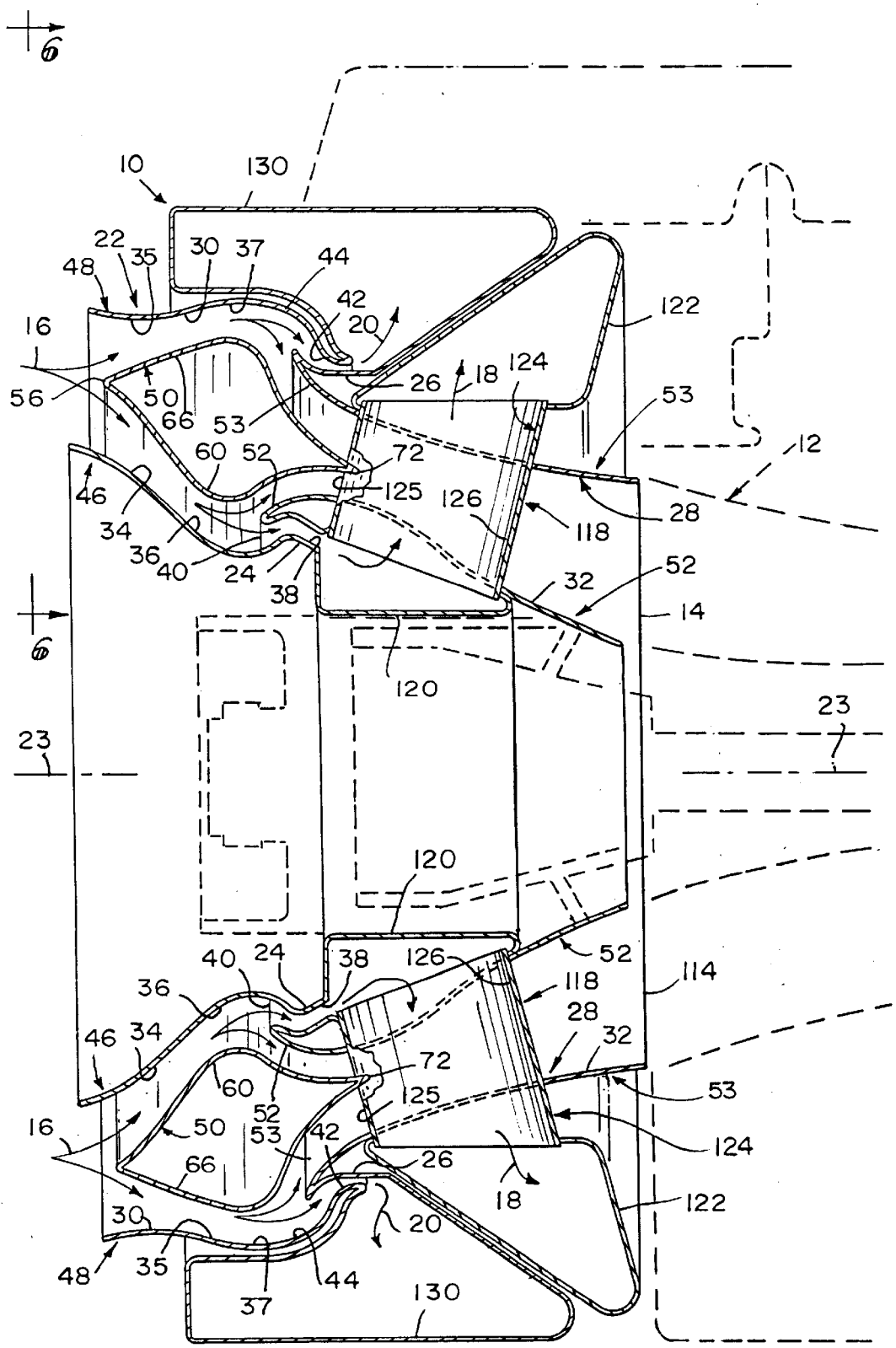
FIG. 5 is a sectional view of the particle separator taken along line 5—5 of FIG. 1
Figure 6:
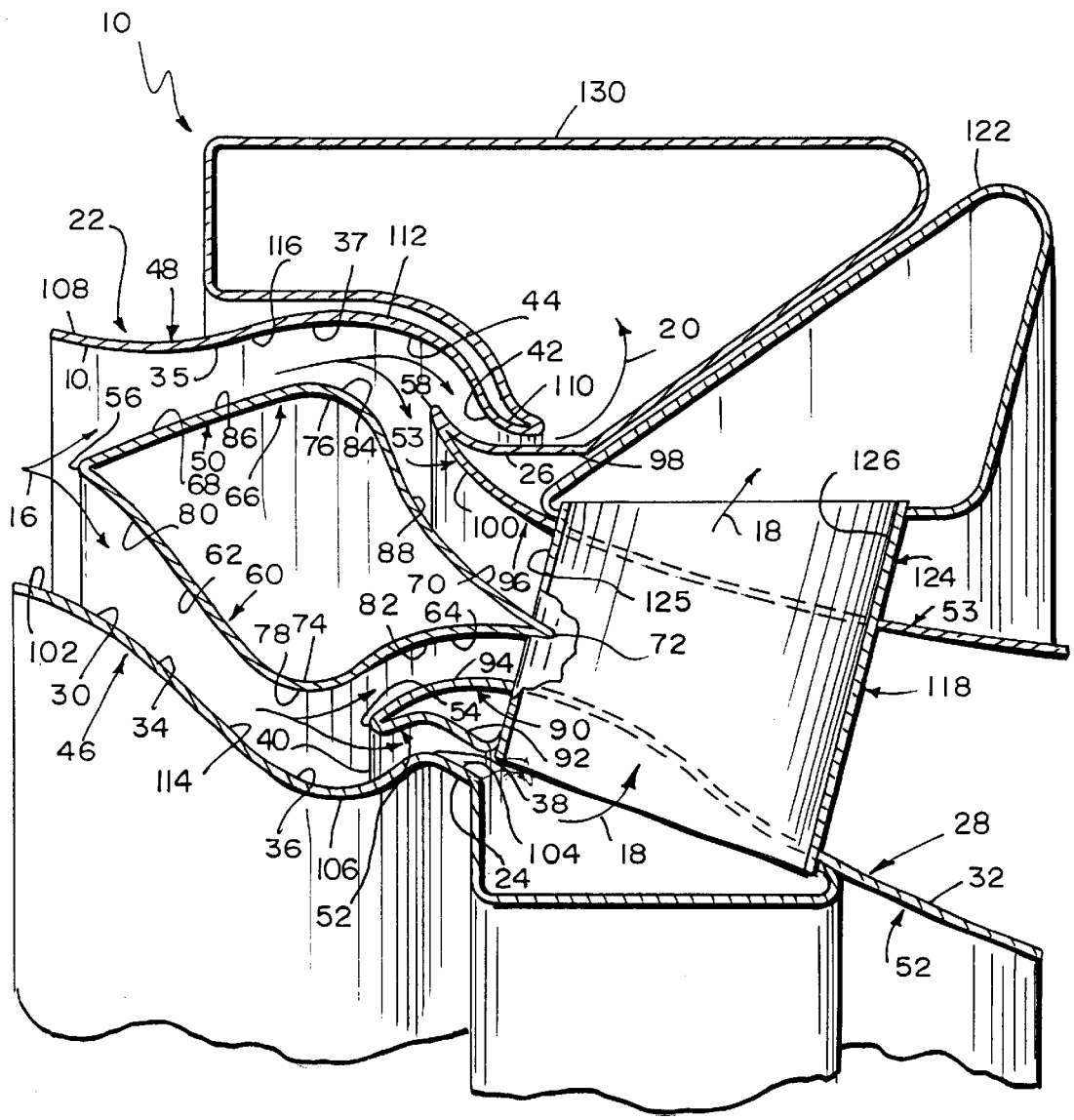
FIG. 6 is a sectional view of the particle separator taken along line 6—6 of FIG. 5.

Intake 22 comprises an annular air intake passageway 28 for conducting air into engine 12, as shown in FIGS. 4–6. Passageway 28 comprises an annular upstream portion 30 and an annular downstream portion 32 in communication with upstream portion 30 and inlet 14. Portion 30 comprises an annular radially inner air intake passageway 34 and an annular radially outer air intake passageway 35 surrounding inner air intake passageway 34. Inner air intake passageway 34 comprises a radially inner turn 36 that extends radially inwardly and then radially outwardly as passageway 34 extends downstream. Outer air intake passageway 35 comprises a radially outer turn 37 that extends radially outwardly and then radially inwardly as passageway 35 extends downstream.

It should be appreciated that air intake 22 can have a tilt angle (i.e., angle of air intake 22 relative to central axis 23) such that each of inner and outer air intake passageways 34, 35 extends continuously radially inwardly or continuously radially outwardly, even after turn 36, 37, rather than extending from a radially inward direction to a radially outward direction or extending from a radially outward direction to radially inward direction. For example, the tilt angle of air intake 22 could be more "steep" than what is shown in FIGS. 5–6. In that case, each of inner and outer air intake passageways 34, 35 could extend continuously radially inwardly. Stated otherwise, passageway 34, 35 could extend radially inwardly upstream from turn 36, 37, through turn 36, 37, and downstream from turn 36, 37.

Separator 10 comprises an annular radially inner particle conduit 24, as shown in FIGS. 4–6. Inner particle conduit 24 comprises an annular inner particle passageway 38 in communication with inner air intake passageway 34 through an annular radially inner opening 40 provided by air intake 22. Inner air intake passageway 34 conducts the radially inner air flow through inner turn 36 such that inertia of inner particles entrained in the inner air flow tends to cause the inner particles to flow from inner air intake passageway 34 through inner opening 40 into inner particle passageway 38 to allow air from the inner air flow to enter inlet 14 without the inner particles. Inner air intake passageway 34 extends downstream from inner opening 40 radially outwardly relative to inner particle passageway 38. Inner particle conduit 24 extends outside air intake passageway 28 as conduit 24 extends from inner opening 40.

Separator 10 comprises an annular radially outer particle conduit 26, as shown in FIGS. 4–6. Outer particle conduit 26 comprises an annular outer particle passageway 42 in communication with outer air intake passageway 35 through an annular radially outer opening 44 provided by air intake 22. Outer air intake passageway 35 conducts the radially outer air flow through outer turn 37 such that inertia of outer particles entrained in the outer air flow tends to cause the outer particles to flow from outer air intake passageway 35 through outer opening 44 into outer particle passageway 42 to allow air from the outer air flow to enter inlet 14 without the outer particles. Outer air intake passageway 35 extends downstream from outer opening 44 radially inwardly relative to outer particle passageway 42. Outer particle conduit 26 extends outside air intake passageway 28 as conduit 26 extends from outer opening 44.

Separator 10 comprises a radially inner sleeve 46, a radially outer sleeve 48, and an annular intermediate flow divider 50, as shown in FIGS. 1, 2, and 4–6. Outer sleeve 48 surrounds inner sleeve 46. Intermediate flow divider 50 is positioned between inner and outer sleeves 46, 48 and surrounds inner sleeve 48.

Separator 10 further comprises an annular radially inner flow divider 52 and an annular radially outer flow divider 53, as shown in FIGS. 4–6. Inner flow divider 52 extends between inner sleeve 46 and intermediate flow divider 50 and surrounds inner sleeve 46. Inner flow divider 52 comprises a leading edge 54 (see FIG. 6) positioned downstream from a leading edge 56 (see FIGS. 5–6) of intermediate flow divider 50, as shown in FIG. 6. Outer flow divider 53 extends between outer sleeve 48 and intermediate flow divider 50 and surrounds inner flow divider 52 and inner sleeve 46. Outer flow divider 53 comprises a leading edge 58 (see FIG. 6) positioned downstream from leading edge 56 of intermediate flow divider 50.

Sleeves 46, 48 and dividers 50, 52, 53 provide air intake 22 and thus air intake passageway 28. Inner sleeve 46, inner flow divider 52, and an annular radially inner wall 60 of intermediate flow divider 50 provide inner air intake passageway 34. More particularly, inner sleeve 46 and inner wall 60 provide an inner upstream air intake passageway 62 (see FIG. 6) of inner air intake passageway 34 and inner flow divider 52 and inner wall 60 provide an inner downstream air intake passageway 64 (see FIG. 6) of inner air intake passageway 34. Outer sleeve 48, outer flow divider 53, and a radially outer wall 66 provide outer air intake passageway 35. More particularly, outer sleeve 48 and outer wall 66 provide an outer upstream air intake passageway 68 (see FIG. 6) of outer air intake passageway 35 and outer flow divider 53 and outer wall 66 provide an outer downstream air intake passageway 70 (see FIG. 6) of outer air intake passageway 35. Inner and outer flow dividers 52, 53 provide downstream portion 32 of air intake passageway 35.

Inner sleeve 46 and inner flow divider 52 provide inner particle conduit 24 and thus inner particle passageway 38. Outer sleeve 48 and outer flow divider 53 provide outer particle conduit 26 and thus outer particle passageway 42. Leading edge 54 of inner flow divider 52 and inner sleeve 46 provide inner opening 40. Leading edge 58 of outer flow divider 53 and outer sleeve 48 provide outer opening 44.

Intermediate flow divider 50 is arranged to divide incoming air flow 16 into the inner air flow and the outer air flow, as shown in FIGS. 5–6. Divider 50 directs the inner air flow into inner upstream air intake passageway 62 and directs the outer air flow into outer upstream air intake passageway 68.

Inner flow divider 52 is arranged to divide the inner air flow, as shown in FIG. 6. The inertia of the inner particles entrained in the inner air flow tends to cause the inner particles to flow from inner upstream air intake passageway 62 into inner particle passageway 38. Air from the inner air flow flows without the inner particles from inner upstream air intake passageway 62 through inner downstream air intake passageway 64 and passageway portion 32 into inlet 14.

Outer flow divider 52 is arranged to divide the outer air flow, as shown in FIG. 6. The inertia of the outer particles entrained in the outer air flow tends to cause the outer particles to flow from outer upstream air intake passageway 68 into outer particle passageway 42. Air from the outer air flow flows without the outer particles from outer upstream air intake passageway 68 through outer downstream air intake passageway 70 and passageway 32 into inlet 14.

Inner sleeve 46 comprises an upstream portion 102, a downstream portion 104, and an intermediate portion 106 extending radially inwardly from portions 102, 104, as shown in FIG. 6. Outer sleeve 48 comprises an upstream portion 108, a downstream portion 110, and an intermediate portion 112 extending radially outwardly from portions 108, 110, as shown in FIG. 6.

Intermediate flow divider 50 comprises leading edge 56, a trailing edge 72, inner wall 60, and outer wall 66, as shown in FIG. 6. Walls 60, 66 extend from leading edge 56 to trailing edge 72.

Inner wall 60 extends radially inwardly from edges 56, 72 to a radially innermost portion 74 of divider 50, as shown in FIG. 6. Innermost portion 74 provides a convex surface 78 that is adjacent to an upstream concave surface 80 which extends from leading edge 56 to surface 78 and is adjacent to a downstream concave surface 82 which extends from surface 78 to trailing edge 72. Inner wall 60 and inner sleeve 46 provide an inner particle acceleration throat 114 to accelerate the inner particles upstream from leading edge 56 of inner flow divider 52 to increase their inertia such that they are more likely to flow into inner particle passageway 38.

Outer wall 66 extends radially outwardly from edges 56, 72 to a radially outermost portion 76 of divider 50, as shown in FIG. 6. Outermost portion 76 provides a convex surface 84 that is adjacent to a generally straight surface 86 which extends from leading edge 56 to surface 84 and is adjacent to a concave surface 88 which extends from surface 84 to trailing edge 72. Outer wall 66 and outer sleeve 48 provide an outer particle acceleration throat 116 to accelerate the outer particles upstream from leading edge 58 of outer flow divider 53 to increase their inertia such that they are more likely to flow into outer particle passageway 42.

Inner flow divider 52 comprises a radially outer wall 90 and a radially inner wall 92, as shown in FIG. 6. Walls 90, 92 curve radially inwardly as they extend upstream toward one another to provide leading edge 54. Wall 90 provides a portion of air intake 22 and wall 92 provides a portion of inner particle conduit 24. Wall 90 comprises a convex surface 94 facing concave surface 82 of intermediate flow divider 50. Intermediate portion 106 of inner sleeve 46, innermost portion 74 of inner wall 60 of intermediate flow divider 50, and outer wall 90 of inner flow divider 52 provide inner turn 36.

Outer flow divider 53 comprises a radially inner wall 96 and a radially outer wall 98, as shown in FIG. 6. Walls 96, 98 curve radially outwardly as they extend upstream toward one another to provide leading edge 58. Wall 96 provides a portion of air intake 22 and wall 98 provides a portion of outer particle conduit 26. Wall 96 comprises a convex surface 100 facing concave surface 88 of intermediate flow divider 50. Intermediate portion 112 of outer sleeve 48, outermost portion 76 of outer wall 66 of intermediate flow divider 50, and inner wall 96 of outer flow divider 53 provide outer turn 37.

Figure 7:
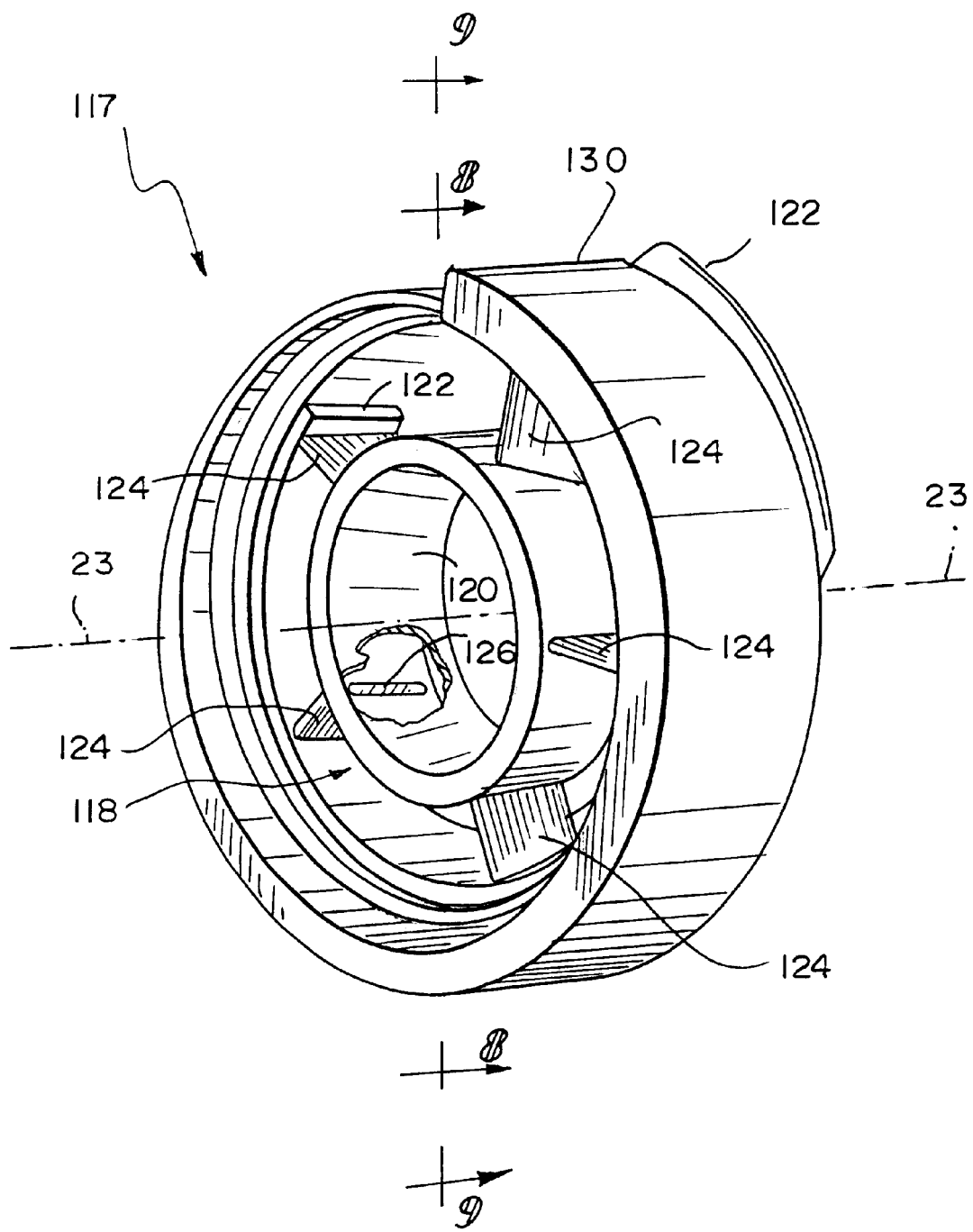
FIG. 7 is a perspective view of a particle discharge system of the particle separator for discharging particles away from the turbine engine.
Figure 8:
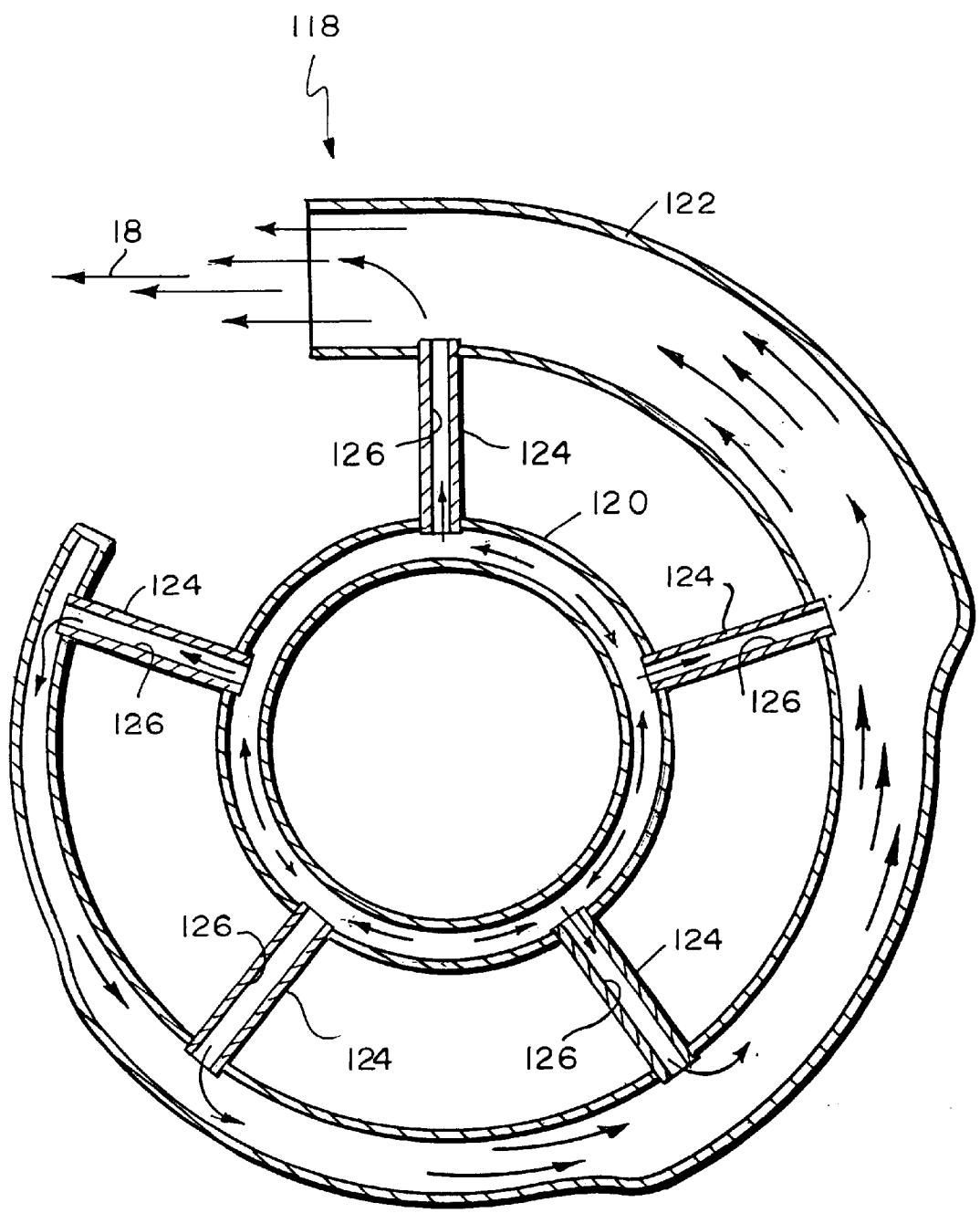
FIG. 8 is a sectional view taken along line 8—8 of FIG. 7, with portions broken away, showing a detail of the particle discharge system.
Figure 9:
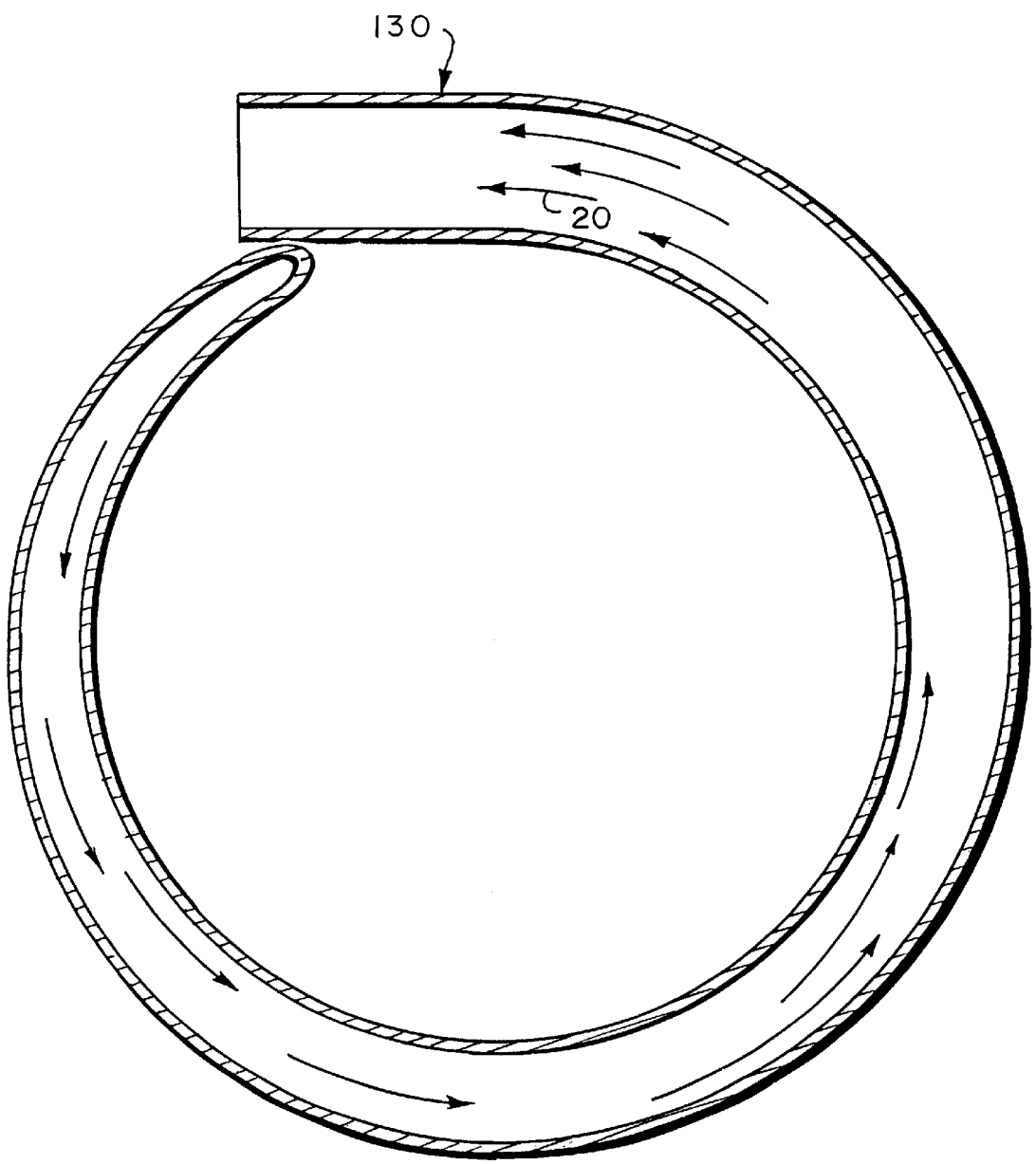
FIG. 9 is a sectional view taken along line 9—9 of FIG. 7, with portions broken away, showing another detail of the particle discharge system.

Separator 10 comprises a particle discharge system 117 for discharging the inner and outer particles away from engine 12, as shown in FIG. 7. System 117 comprises an inner particle discharge system 118 for discharging the inner particles away from engine 12 (see FIGS. 3 and 5–8). System 118 comprises an annular first inner particle collector 120, a second inner particle collector 122, and a plurality of circumferentially spaced inner particle transfer conduits or flow divider mounts 124 coupled to collectors 120, 122. Collector 120 is coupled to inner particle conduit 24 (or more particularly to inner wall 92 and downstream portion 104) for communication with inner particle passageway 38 to receive the inner particles therefrom. The inner particles then flow radially outwardly from collector 120 through transfer passageways 126 of conduits 124 to collector 122 for discharge away from engine 12. A suction source (not shown) of system 118, such as a blower or an ejector, is positioned in collector 122 to advance the inner particles from inner particle passageway 38 through system 118 and away from engine 12.

Conduits 124 extend through downstream portion 32 of air intake passageway 28 and through walls 90, 96 of inner and outer flow dividers 52, 53, respectively, as shown in FIGS. 5–6. Trailing edge 72 of intermediate flow divider 50 is coupled to leading edges 125 of conduits 124 to mount intermediate flow divider 50 in fixed position between inner and outer sleeves 46, 48 and inner and outer flow dividers 52, 53. In some embodiments, the trailing edge 72 has "scalloped" or otherwise concave portions. Each concave portion mates with and is mounted to a convex leading portion of an outer surface of one of the conduits 124 wherein such convex leading portion includes the leading edge 125 of the conduit 124.

System 117 further comprises an outer particle discharge system for discharging the outer particles away from engine 12. The outer particle discharge system comprises an outer particle collector 130 (see FIGS. 1, 5–7, and 9) coupled to outer particle conduit 26 (or more particularly to outer wall 98 and downstream portion 110) to receive the outer particles therefrom. A suction source (not shown) of the outer particle discharge system, such as a blower or ejector, is positioned in collector 130 to advance the outer particles from outer particle passageway 42 through collector 130 and away from engine 12. It should be appreciated that there may be one or more suction sources in common with both inner particle discharge system 118 and the outer particle discharge system instead of a separate suction source for each system.

Figure 10:
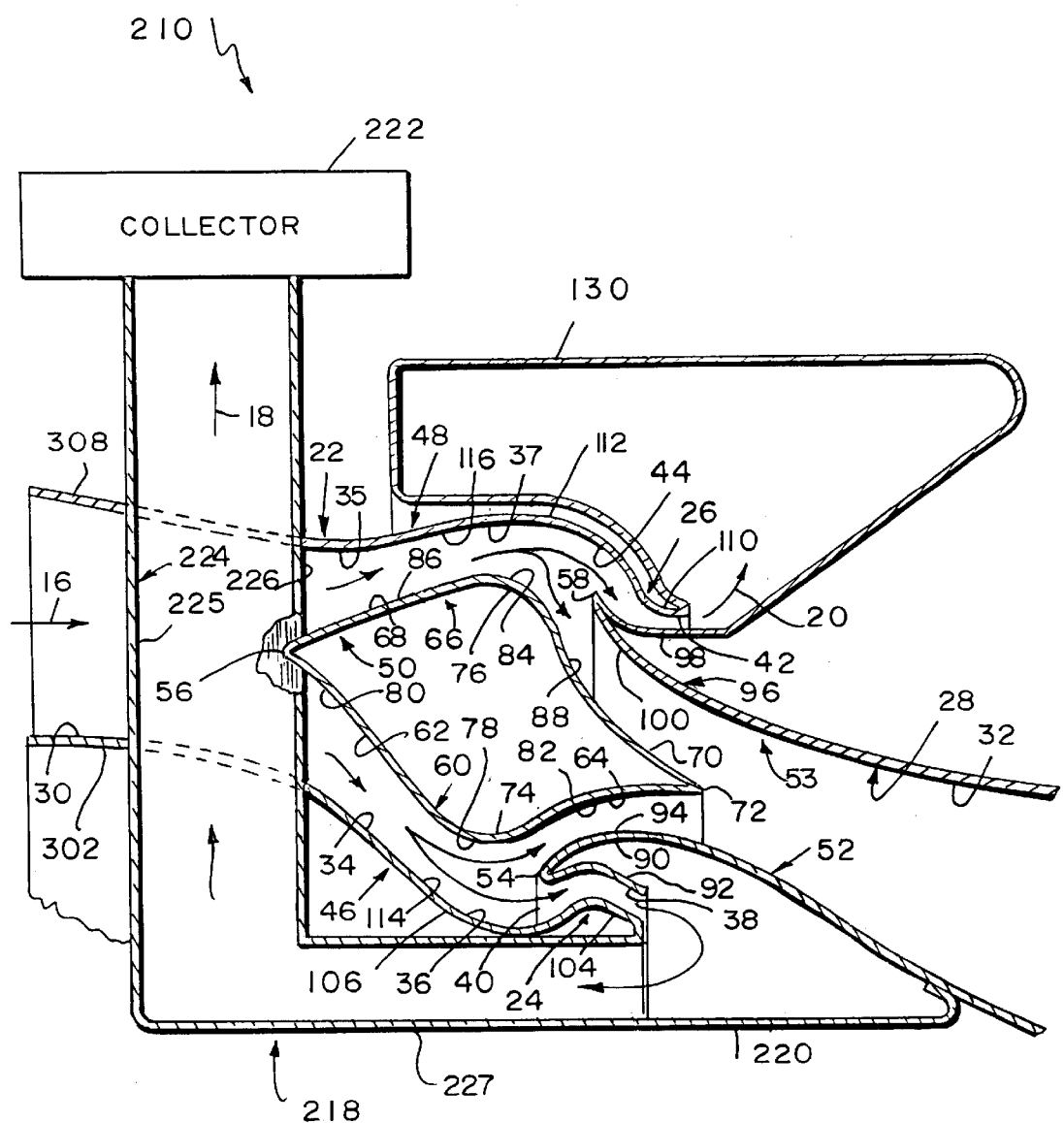
FIG. 10 is a sectional view of a portion of another particle separator.

A particle separator 210 for use with engine 12 to separate particles from air entering engine 12 is shown in part in FIG. 10. Separator 210 is similar to separator 10 in structure and function, except as otherwise noted, so that corresponding reference numbers refer to corresponding structures. Separator 210 primarily differs from separator 10 in the way that the inner particles are discharged away from engine 10 and intermediate flow divider 50 is mounted.

Separator 210 comprises an inner particle discharge system 218 for discharging the inner particles away from engine 12. System 218 comprises an annular first inner particle collector 220, a second inner particle collector 222, and a plurality of circumferentially spaced inner particle transfer conduits 224 comprising transfer passageways 225 in communication with collectors 220, 222. Collector 220 is coupled to inner particle conduit 24 (or more particularly to inner wall 92 and downstream portion 104) for communication with inner particle passageway 38 to receive the inner particles therefrom. The inner particles are then conducted axially forwardly by a conduit 227 to passageways 225 of conduits 224 which direct the inner particles radially outwardly to collector 222 for discharge away from engine 12. A suction source (not shown) of system 218, such as a blower or an ejector, is positioned in collector 222 to advance the inner particles from inner particle passageway 38 through system 218 and away from engine 12.

Conduits 224 extend from an upstream portion 302 of inner sleeve 46 through upstream portion 30 of air intake passageway 28 to an upstream portion 308 of outer sleeve 48. Portions 302, 308 are somewhat longer than corresponding portions 102, 108 of separator 10 to accommodate positioning conduits 224 in front of intermediate flow divider 50. Leading edge 56 of intermediate flow divider 50 is coupled to trailing edges 226 of conduits 224 to mount intermediate flow divider 50 in fixed position between inner and outer sleeves 46, 48 and inner and outer flow dividers 52, 53. In some embodiments, the leading edge 56 has "scalloped" or otherwise concave portions. Each concave portion mates with and is mounted to a convex trailing portion of an outer surface of one of the conduits 224 wherein such convex trailing portion includes the trailing edge 226 of the conduit 224.

It should be appreciated that, with respect to each separator 10, 210, the inner particles separated from the air flow entering the engine 12 could be routed so that they do not cross back through the air intake passageway 28 for discharge away from the engine 12. For example, in some embodiments, the separator 10, 210 has structure that routes the separated inner particles radially inwardly relative to the air intake 22 and axially forwardly to a location in front of the air intake 22 for discharge of the separated inner particles away from the engine 12 and away from the flow of air entering the air intake 22. Such structure does not cross through the air intake passageway 28. It should be appreciated that the structure for routing the separated inner particles away from the engine 12 could be arranged to route the separated inner particles to one or more other locations instead of or in addition to a location in front of the air intake 22 without crossing through the air intake passageway 28.

It is believed that each separator 10, 210 operates more efficiently in separating particles from air flow entering a turbine engine than the array of particle separators disclosed in U.S. application Ser. No. 09/920,566, filed Aug. 1, 2001.

What is claimed is:

1. A particle separator for use with a turbine engine to separate particles from air entering the turbine engine, the particle separator comprising an air intake comprising an annular air intake passageway for conducting air into the turbine engine, the air intake passageway comprising an annular radially inner air intake passageway and an annular radially outer air intake passageway surrounding the inner air intake passageway, the air intake comprising an annular radially inner opening communicating with the inner air intake passageway and an annular radially outer opening communicating with the outer air intake passageway, the inner air intake passageway comprising a radially inner turn, the outer air intake passageway comprising a radially outer turn, an annular radially inner particle conduit comprising an annular radially inner particle passageway communicating with the inner air intake passageway through the inner opening, the inner air intake passageway being arranged to conduct a radially inner air flow through the inner turn such that inertia of inner particles entrained in the inner air flow tends to cause the inner particles to flow from the inner air intake passageway through the inner opening into the inner particle passageway to allow air from the inner air flow to enter the turbine engine without the inner particles, the inner particle conduit extending outside the air intake passageway as the inner particle conduit extends from the inner opening, and an annular radially outer particle conduit comprising an annular radially outer particle passageway communicating with the outer air intake passageway through the outer opening, the outer air intake passageway being arranged to conduct a radially outer air flow through the outer turn such that inertia of outer particles entrained in the outer air flow tends to cause the outer particles to flow from the outer air intake passageway through the outer opening into the outer particle passageway to allow air from the outer air flow to enter the turbine engine without the outer particles, the outer particle conduit extending outside the air intake passageway as the outer particle conduit extends from the outer opening.

2. The particle separator of claim 1, wherein the air intake and the inner particle conduit provide a radially inner sleeve and an annular radially inner flow divider, the air intake and the outer particle conduit provide a radially outer sleeve and an annular radially outer flow divider, the outer sleeve surrounds the inner sleeve, the inner and outer flow dividers extend between the inner and outer sleeves, and the outer flow divider surrounds the inner flow divider.

3. The particle separator of claim 2, wherein the air intake comprises an annular intermediate flow divider positioned between the inner and outer sleeves and surrounding the inner sleeve, the intermediate flow divider extends between the inner and outer flow dividers, the inner sleeve and the intermediate and inner flow dividers provide the inner air intake passageway, and the outer sleeve and the intermediate and outer flow dividers provide the outer air intake passageway.

4. The particle separator of claim 3, wherein the intermediate flow divider comprises a leading edge, a trailing edge, a radially inner wall extending radially inwardly from the leading and trailing edges, and a radially outer wall extending radially outwardly from the leading and trailing edges.

5. The particle separator of claim 3, further comprising an inner particle transfer conduit in communication with the inner particle passageway and extending through the air intake passageway to conduct the inner particles to a location radially outwardly relative to the air intake, and the intermediate flow divider is mounted to the inner particle transfer conduit.

6. The particle separator of claim 5, further comprising an annular first inner particle collector in communication with the inner particle passageway and the inner particle transfer conduit to receive the inner particles from the inner particle passageway and conduct the inner particles to the inner particle transfer conduit, the first inner particle collector being positioned radially inwardly relative to the air intake.

7. The particle separator of claim 6, further comprising a second inner particle collector in communication with the inner particle transfer conduit to receive the inner particles therefrom and discharge the inner particles away from the turbine engine, the second inner particle collector being positioned radially outwardly relative to the air intake.

8. The particle separator of claim 6, further comprising an outer particle collector in communication with the outer particle passageway to receive the outer particles therefrom and discharge the outer particles away from the turbine engine, the outer particle collector being positioned radially outwardly relative to the air intake.

9. The particle separator of claim 3, further comprising a flow divider mount, a leading edge of the intermediate flow divider being coupled to the flow divider mount to position the intermediate flow divider between the inner and outer sleeves.

10. The particle separator of claim 3, wherein the inner and outer flow dividers provide an annular downstream portion of the air intake passageway to receive the inner and outer air flows from the inner and outer air intake passageways.

11. The particle separator of claim 3, further comprising a flow divider mount, a trailing edge of the intermediate flow divider being coupled to the flow divider mount to position the intermediate flow divider between the inner and outer sleeves.

12. The particle separator of claim 2, wherein the inner flow divider curves radially inwardly toward a leading edge of the inner flow divider, and the outer flow divider curves radially outwardly toward a leading edge of the outer flow divider.

13. The particle separator of claim 1, wherein the inner air intake passageway curves radially inwardly and then radially outwardly as it extends downstream to provide the inner turn, and the outer air intake passageway curves radially outwardly and then radially inwardly as it extends downstream to provide the outer turn.

14. A particle separator for use with a turbine engine to separate particles from air entering the turbine engine, the particle separator comprising an air intake passageway for conducting air into the turbine engine, the air intake passageway comprising an annular radially inner air intake passageway for conducting an inner air flow and an annular radially outer air intake passageway for conducting an outer air flow and surrounding the inner air intake passageway, an annular radially inner particle passageway in communication with the inner air intake passageway through an annular radially inner opening such that inertia of inner particles entrained in the inner air flow tends to cause the inner particles to flow from the inner air intake passageway into the inner particle passageway to allow air from the inner air flow to flow through the inner air intake passageway and into the turbine engine without the inner particles, the inner air intake passageway extending downstream from the inner opening radially outwardly relative to the inner particle passageway, and an annular radially outer particle passageway in communication with the outer air intake passageway through an annular radially outer opening such that inertia of outer particles entrained in the outer air flow tends to cause the outer particles to flow from the outer air intake passageway into the outer particle passageway to allow air from the outer air flow to flow through the outer air intake passageway and into the turbine engine without the outer particles, the outer air intake passageway extending downstream from the outer opening radially inwardly relative to the outer particle passageway.

15. The particle separator of claim 14, comprising an annular radially inner sleeve, an annular radially outer sleeve surrounding the inner sleeve, an annular intermediate flow divider positioned between the inner and outer sleeves and surrounding the inner sleeve, an annular radially inner flow divider positioned between the intermediate flow divider and the inner sleeve and surrounding the inner sleeve, and an annular radially outer flow divider positioned between the intermediate flow divider and the outer sleeve and surrounding the inner flow divider, the inner sleeve and the intermediate and inner flow dividers provide the inner air intake passageway, and the outer sleeve and the intermediate and outer flow dividers provide the outer air intake passageway.

16. The particle separator of claim 15, wherein the inner sleeve and the inner flow divider provide the inner opening and the inner particle passageway, and the outer sleeve and the outer flow divider provide the outer opening and the outer particle passageway.

17. The particle separator of claim 15, wherein the inner sleeve and the inner flow divider provide an annular radially inner boundary of the air intake passageway and the inner air intake passageway, and the outer sleeve and the outer flow divider provide an annular radially outer boundary of the air intake passageway and the outer air intake passageway.

18. The particle separator of claim 17, wherein the intermediate flow divider provides an annular radially outer boundary of the inner air intake passageway, and the intermediate flow divider provides an annular radially inner boundary of the outer air intake passageway.

19. The particle separator of claim 14, comprising a flow divider mount extending from the inner flow divider through the air intake passageway to the outer flow divider, and a trailing edge of the intermediate flow divider is coupled to the flow divider mount to mount the intermediate flow divider between the inner and outer sleeves.

20. The particle separator of claim 19, wherein the flow divider mount is formed to include a transfer passageway in communication with the inner particle passageway to conduct the inner particles for discharge away from the turbine engine.

21. The particle separator of claim 14, comprising a flow divider mount extending from the inner sleeve through the air intake passageway to the outer sleeve, and a leading edge of the intermediate flow divider is coupled to the flow divider mount to mount the intermediate flow divider between the inner and outer sleeves.

22. The particle separator of claim 21, wherein the flow divider mount is formed to include a transfer passageway in communication with the inner particle passageway to conduct the inner particles for discharge away from the turbine engine.

23. A particle separator for use with a turbine engine to separate particles from air entering the turbine engine, the particle separator comprising a radially inner sleeve and a radially outer sleeve surrounding the inner sleeve, an annular intermediate flow divider positioned between the inner sleeve and the outer sleeve and surrounding the inner sleeve, the intermediate flow divider and the inner sleeve providing an annular radially inner upstream air intake passageway, the intermediate flow divider and the outer sleeve providing an annular radially outer upstream air intake passageway, the intermediate flow divider being arranged to divide a flow of air into a radially inner air flow that flows into the inner upstream air intake passageway and a radially outer air flow that flows into the outer upstream air intake passageway, an annular radially inner flow divider extending between the intermediate flow divider and the inner sleeve such that a leading edge of the inner flow divider is positioned downstream from a leading edge of the intermediate flow divider, the inner and intermediate flow dividers providing an annular radially inner downstream air intake passageway, the inner flow divider and the inner sleeve providing an annular radially inner particle passageway, the inner flow divider being arranged to divide the inner air flow such that inertia of inner particles entrained in the inner air flow tends to cause the inner particles to flow from the inner upstream air intake passageway into the inner particle passageway to allow air from the inner air flow to flow from the inner upstream air intake passageway through the inner downstream air intake passageway and into the turbine engine without the inner particles, the inner downstream air intake passageway being positioned radially outwardly relative to the inner particle passageway, and an annular radially outer flow divider extending between the intermediate flow divider and the outer sleeve such that a leading edge of the outer flow divider is positioned downstream from a leading edge of the intermediate flow divider, the outer and intermediate flow dividers providing an annular radially outer downstream air intake passageway, the outer flow divider and the outer sleeve providing an annular radially outer particle passageway, the outer flow divider being arranged to divide the outer air flow such that inertia of outer particles entrained in the outer air flow tends to cause the outer particles to flow from the outer upstream air intake passageway into the outer particle passageway to allow air from the outer air flow to flow from the outer upstream air intake passageway through the outer downstream air intake passageway and into the turbine engine without the outer particles, the outer downstream air intake passageway being positioned radially inwardly relative to the outer particle passageway.

24. The particle separator of claim 23, wherein the inner sleeve and the inner flow divider provide an annular radially inner opening through which the inner particles flow from the inner upstream air intake passageway into the inner particle passageway, and the outer sleeve and the outer flow divider provide an annular radially outer opening through which the outer particles flow from the outer upstream air intake passageway into the outer particle passageway.

25. The particle separator of claim 23, wherein the inner upstream and downstream air intake passageways provide an annular radially inner air intake passageway comprising an annular radially inner turn through which the inner air flow flows such that inertia of the inner particles tends to cause the inner particles to flow from the inner air intake passageway into the inner particle passageway without flowing completely through the inner turn, and the outer upstream and downstream air intake passageways provide an annular radially outer air intake passageway comprising an annular radially outer turn through which the outer air flow flows such that inertia of the outer particles tends to cause the outer particles to flow from the outer air intake passageway into the outer particle passageway without flowing completely through the outer turn.

26. The particle separator of claim 23, wherein the intermediate flow divider comprises a trailing edge, the inner upstream and downstream air intake passageways provide an annular radially inner air intake passageway extending radially inwardly and then radially outwardly as it extends from the leading edge of the intermediate flow divider to the trailing edge of the intermediate flow divider, and the outer upstream and downstream air intake passageways provide an annular radially outer air intake passageway surrounding the inner air intake passageway and extending radially outwardly and then radially inwardly as it extends from the leading edge of the intermediate flow divider to the trailing edge of the intermediate flow divider.

27. The particle separator of claim 23, wherein the inner flow divider surrounds the inner sleeve, and the outer flow divider surrounds the inner flow divider.

* * * * *

UNITED STATES PATENT AND TRADEMARK OFFICE
CERTIFICATE OF CORRECTION

PATENT NO. : 6,698,180 B2
DATED : March 2, 2004
INVENTOR(S) : Philip H. Snyder

It is certified that error appears in the above-identified patent and that said Letters Patent is hereby corrected as shown below:

Column 1,
Line 7, the following sentences should be inserted:
-- This invention was made with U.S. Government support under agreement number DAAH10-00-2-0007. The U.S. Government has certain rights in the invention. --

Signed and Sealed this

Twenty-fifth Day of January, 2005

JON W. DUDAS
*Director of the United States Patent and Trademark Office*